United States Patent [19]
Lamport

[11] Patent Number: 6,162,315
[45] Date of Patent: Dec. 19, 2000

[54] METHOD FOR MAKING A MULTIPLE DENSITY FRICTION MATERIAL PAD

[75] Inventor: Robert Anthony Lamport, Centerville, Ohio

[73] Assignee: Delphi Technologies, Inc., Troy, Mich.

[21] Appl. No.: 09/302,890

[22] Filed: Apr. 30, 1999

[51] Int. Cl.[7] ...................................................... B32B 31/20
[52] U.S. Cl. .......................... 156/204; 156/227; 156/322; 188/251 R; 188/250 B; 264/258
[58] Field of Search .................................... 156/62.2, 204, 156/226, 227, 322; 428/297.4; 188/71.1, 250 R, 251 R, 257, 250 B; 264/258

[56] References Cited

U.S. PATENT DOCUMENTS 5,894,049  4/1999  Lamport .

*Primary Examiner*—Sam Chuan Yao
*Attorney, Agent, or Firm*—Robert M. Sigler

[57] ABSTRACT

A friction material pad comprises a lamination of stacked sheets, each of which has a top edge forming the friction face that is generally parallel to the direction of relative rotation between the friction pad and an opposing rotary member. Each sheet is formed by a wet paper making process and has a plurality of unwoven fibers, platelets, flakes, or the like, more than half of which are oriented within 45° of perpendicularity to the top edge, the sheets being bound together by a resin binder to form a lamination in which the sheet edges progress from inner to outer sheets to form the friction face of the pad, each sheet having the same blend of friction and lubricating particles, fibers and fillers in a resin matrix. Three groups of sheets are heat aged to different densities and have different friction, hardness and stiffness characteristics. These groups of sheets are combined to provide a monolithic friction material pad having different densities in different areas of the pad to provide a pad having generally uniform wear and friction over the friction face and yet having improved noise attenuation. Thus, a pad can be tailored to any specific application by varying the amount and locations of these different groups of sheets.

3 Claims, 1 Drawing Sheet

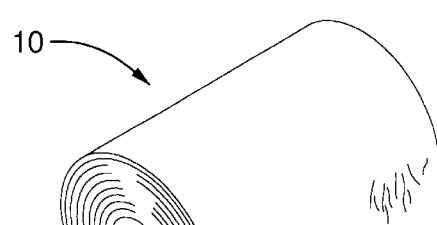
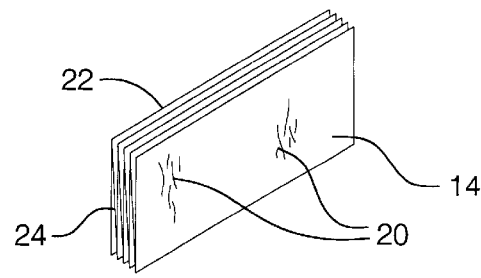
FIG. 2 A
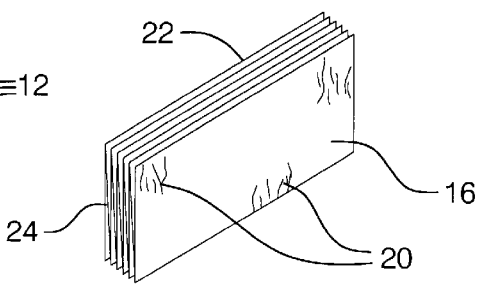
FIG. 2 B
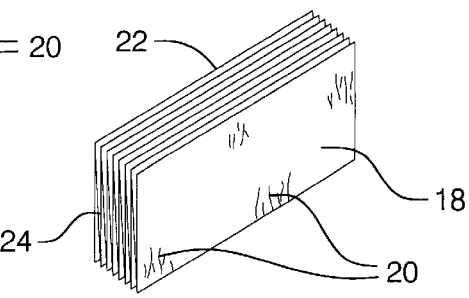
FIG. 2 C
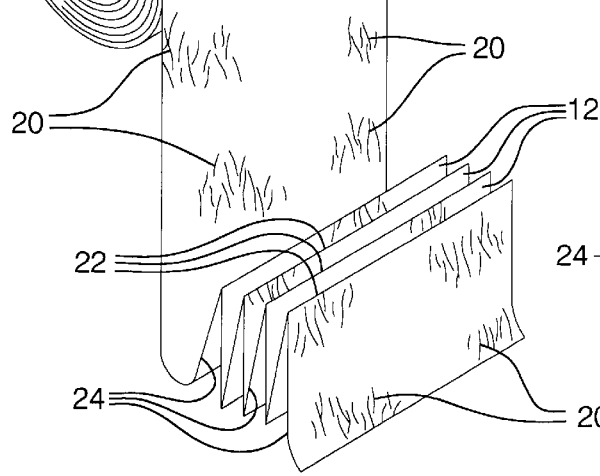
FIG. 1
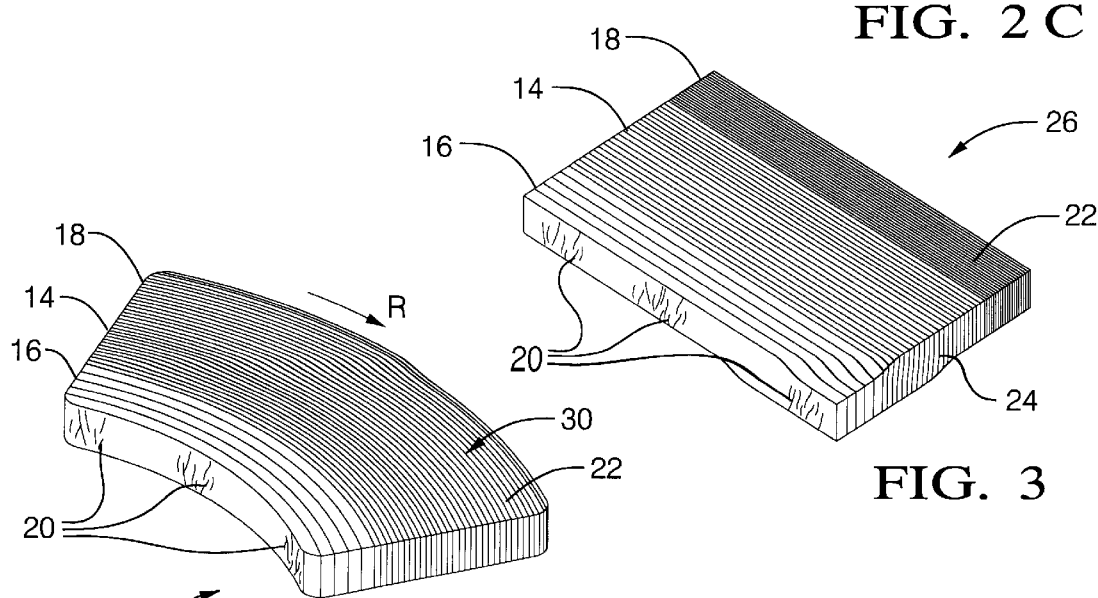
FIG. 3
FIG. 4

METHOD FOR MAKING A MULTIPLE DENSITY FRICTION MATERIAL PAD

TECHNICAL FIELD

This invention relates to friction material pads and, more particularly, to a friction material pad which has areas of different densities.

BACKGROUND OF THE INVENTION

Friction materials used in automotive pads have certain friction, wear and noise characteristics. The ideal pad would produce a constant friction at all operating temperatures, would operate noiselessly, and would experience negligible wear throughout a nearly infinite life. This is the holy grail of friction material formulators. Of course, such a utopian material has yet to be discovered. Until then, formulators continually try to optimize these three characteristics: friction uniformity (low "brake fade"), good wear (long life) and low noise (attenuation) by creating new friction material formulations.

Conventional friction material pads are produced by dry blending friction and lubricating particles, fibers and fillers in a resin matrix, forming into pucks and then heating under pressure in a mold to produce pads, which are bonded to backing plates for use in brakes, clutches and the like. These pads are generally physically homogeneous and thus have uniform density, hardness, compressibility, dampening and wear resistance throughout. During the molding process, the applied pressure causes most of the fibers to orient generally parallel to the wear face of the pad. When the pad is subject to use, friction produces heat which tends to cause the fibers to be pried out of the matrix since they lie nearly wholly on the surface of the friction face. This causes a degradation of friction characteristics and accelerates pad wear.

Patent application Ser. No. 08/922436, filed Sep. 2, 1997 and issued as U.S. Pat. No. 5,894,049 on Apr. 13, 1999 discloses a process which addresses this problem by forming a length of paper that has a majority of the fibers oriented generally parallel to the length of the paper. The paper is then folded or cut into strips which are laminated, with the edges of the paper strips oriented perpendicular to the pad wear surface and perpendicular to the direction of relative rotation of the pad and its mating friction surface. This arrangement provides a pad having wear characteristics superior to conventional pads because the fibers, platelets, flakes or the like are imbedded in the material matrix perpendicular to the friction face, and cannot be pried out and lost.

The outer diameter, or edge of a friction material pad wears faster than the inner diameter, or edge, due to a higher relative linear velocity between the pad and its opposing friction surface, usually a brake disk. To overcome this unequal wear problem, a friction material pad has been developed which comprises a lamination of several stacks of sheets, each of which has a different composition. All of the sheets have a top edge forming the friction face that is generally parallel to the direction of relative rotation between the friction pad and opposing rotary member. Each sheet has a plurality of unwoven fibers, more than half of which are oriented within 45° of perpendicularity to the top edge. The sheets are bound together by a resin binder to form a lamination in which the sheet edges progress from inner to outer sheets to form the friction face of the pad. When laminated together, these stacks of sheets provide sections of the pad with different friction and wear characteristics which produces a pad which experiences generally uniform wear over its face during operation.

This new multi-laminate pad requires that several different friction material papers be developed and manufactured to make a single pad.

It would be desirable to provide a friction material pad in which different areas of the pad friction face have variable friction, wear rates, compressibility and stiffness (for noise attenuation) to produce a pad that is tailored to any specific applications.

It would also be desirable to provide such a friction material pad that does not require the use of several different papers all having different compositions.

It would be further desirable to provide such a friction material pad that exhibits generally uniform friction at all operating temperatures.

SUMMARY OF THE INVENTION

It is an object of this invention to provide a friction material pad formed of a lamination of papers in which different areas of the pad friction face have different friction, wear rates and stiffness (for noise attenuation) to produce a pad that is tailored to any specific application.

It is another object of this invention to provide such a friction material pad that does not require the use of several different papers all having different compositions.

It is a further object of this invention to provide such a friction material pad that exhibits generally uniform friction at all operating temperatures.

It has been found that heat aging of friction material papers prior to molding affects their material characteristics. Thus, more heat aging causes more resin cross-linking, which produces less resin flow during molding. This causes increased porosity, and corresponding lower density, which increases compressibility, wear rates and damping.

In one aspect, this invention features a friction material pad having a friction face that comprises a lamination of sheets, the top edges of which form the friction face. Each sheet has a plurality of unwoven fibers, more than half of which are oriented within 45° of perpendicularity to the top edge, the sheets being bound together by a resin binder to form the lamination in which some of the sheets have a first density and other of the sheets have a second density to form a monolithic pad having areas of multiple densities.

Preferably, the sheets are all heat aged prior to lamination to provide the first and second plurality of sheets having different densities, resulting a monolithic pad which has areas of multiple densities and which exhibits generally uniform wear over its friction face during operation.

In another aspect, this invention features a method of making a friction material pad having a friction face, comprising the steps of providing sheets of paper having top edges and including friction and lubricating particles, fillers and a plurality of nonwoven fibers in a resin matrix, heat aging a first plurality of sheets to a first density, heat aging a second plurality of sheets to a second and lower density, stacking said pluralities of sheets together to form a laminate, and hot pressing the laminate to form a pad having areas of multiple densities.

These and other objects and features of this invention will become more readily apparent upon reference to the following detailed description of a preferred embodiment, with reference to the accompanying drawings.

BRIEF DESCRIPTION OF THE DRAWINGS

FIG. 1 is a schematic perspective view of a roll of fibrous paper illustrating the fan fold method of forming a friction material lamination;

FIGS. 2a, 2b and 2c are perspective views of three different stacks of sheets of the same paper, with each being processed to a different density so as to have different friction, stiffness and wear characteristics;

FIG. 3 is a perspective view of a lamination formed of the stacks of sheets of FIGS. 2a, 2b and 2c; and FIG. 4 is a perspective view of a finished monolithic friction material pad formed from the lamination of FIG. 3.

DESCRIPTION OF THE PREFERRED EMBODIMENT

A continuous roll or sheet of friction material paper or felt 10 is produced by forming a wet slurry, extracting the solution and forming the paper by known papermaking practices. The paper is made with reinforcing fibers, platelets, flakes and the like; and other friction enhancing and lubricating and filler materials that are blended together with a resin binder to provide a friction material having predetermined friction, wear and noise characteristics. During the paper-making process, drum speed, vacuum force, slurry viscosity, agitation and fiber length are controlled to produce a paper having at least half of the fibers oriented parallel to the length of the paper, or, in other words, perpendicular to the side edge of the paper roll.

During the papermaking and pad formation, various amounts of various ingredients are added to provide the desired composition. Fibers, flakes or platelets that can be used are glass wool, carbon, graphite, aramid, polyamide, copper, bronze, mica, vermiculite or various ceramic fibers. Usually a phenolic resin is used as binding agent, although others can be used. Friction enhancing materials that may be added include particles of alumina, zirconia, iron oxide, and tungsten oxide. Lubricant additives may include molybdenum disulfide, calcium fluoride, tungsten sulfide, graphite and molybdenum oxide. Fillers can include barium sulfate and calcium carbonate, while stabilizers such as sulfides of antimony and zinc can be used.

This wet paper making process enables a much better distribution of fibers and particles throughout the finished friction material pad, with a greater uniformity of dispersion across the friction face. The papers comprising this invention contain such fibers as aramid, PAN, potassium titanate, glass wool and bronze wool comprising 10%–75% of the total composition. Amorphous carbon, graphite and various oxides are added, while the thermosetting resin binder, such as phenolic resin, comprises 15%–25% of volume. As stated above, a majority of fibers are generally oriented perpendicular to the pad's friction face 30. This process allows the use of much larger fibers, flakes and platelets than can be done using a conventional dry blending process.

After drying, the paper may be cut into a plurality of sheets of a dimension commensurate with the thickness of finished friction material pad desired. Alternatively, the paper can be pleated to form pleats 12 of uniform size, as illustrated in FIG. 1. A predetermined number of these sheets are then combined into a first stack of sheets 14 (FIG. 2a), a second stack 16 (FIG. 2b), and a third stack 18 (FIG. 2c). In each sheet, at least 50% of the fibers 20 are oriented within 45° of perpendicularity with top edges 22 of the sheets, or parallelism with side edges 24. The composition of all stacks is the same.

Each stack of sheets is then preheated (heat aged) for a different combination of temperature and time to advance resin crosslinking in the paper so as to precisely raise its melt viscosity by a different amount. This produces stacks of papers having different porosities and densities and different hardnesses. Longer heating at the same temperature produces more resin crosslinking and thus higher melt viscosity and lower density. It has been found that different time/temperature conditions produce different material densities.

As illustrated, the stacks of sheets 14, 16 and 18 are then temporarily secured together by cold or warm squeezing or pressing, needle punching or stitching to form a preform 26, as shown in FIG. 3. The top edges 22 of each of the sheets in each stack are oriented lengthwise of the preform 26. In this preform, at least 50% of the fibers 20 are oriented within 45° of perpendicularity with top edges 22, or parallelism with side edges 24.

The laminate is then hot pressed or molded to form a friction material pad 28 shown in FIG. 4, with the top edges 22 of the individual sheets or pleats forming the friction face 30 of pad 28. The top edges 22 are all oriented parallel to the direction of intended rotation R of pad 28 relative to its opposing rotary member, usually a brake disk (not illustrated) which operate in a well-known manner to brake an automotive vehicle. This orientation assures that a majority of fibers are perpendicular to friction face 30. This reduces instances of fiber loss due to pad wear, fiber pull-out, and resin decomposition, which enhances pad life. This edge orientation will produce better noise characteristics than orientations perpendicular to or otherwise angled to the direction of relative rotation R.

Because a friction material pad is used in a rotating environment, with it being applied to the surface of a rotating brake rotor, the relative velocity of the pad and rotor varies from the radially inside edge of the pad to the radially outside edge. As a result, for a friction pad of uniform composition, the outer pad edge tends to experience greater wear than the inside edge. Friction material compositions having the same general composition except for the amount of friction enhancers will generally produce different frictional and wear characteristics, with friction and wear increasing or decreasing together.

In pad 28, all constituent stacks of paper 14, 16 and 18 were preheated to a temperature of 310° F. prior to assembly and hot pressing to form pad 28. Stack 14 was heated for 10 minutes, which produced a density of 2.0 in pad 28. Stack 16 was heated for 3 minutes, which produced a density of 2.18, and stack 18 was heated for 15 minutes, which produced a density of 1.95. As the densities varied, so too did the hardness, which varied directly with the density. Variation of the various density papers in various pads produced resultant pads having variations in resonant frequencies and damping ability.

Since pad 28, as constituted, has areas of different densities, it will exhibit generally uniform wear over its face, due to the three different densities of the stacks of friction material papers 14, 16 and 18 utilized. While use of three different densities of papers is illustrated and described, certain applications could dictate the use of only two densities of papers, while others might benefit from the use of four or more types. Thus, each of the stacks 14, 16 and 18 could be heated for different time periods, and could be combined in any of a variety of combinations in the finished multiple density pad. The net result of this use of variable amounts of the different density papers is a monolithic friction material pad that can be tailored to different specific vehicle applications. This invention does not require that all of the friction material be heat aged. For example, pads may be composed of large areas that are not heat aged, separated by bands of heat-aged, and lower density, material to improve pad damping.

While only preferred embodiments have been shown and described, obvious modifications thereof are contemplated within the scope of this invention and the following claims, in which the term "fibers" is meant to include platelets, flakes and the like.

I claim:

1. A method of making a friction material pad having a friction face, comprising the steps of providing sheets of paper having top edges and including friction and lubricating particles, fillers and a plurality of nonwoven fibers in a resin matrix, heat aging a first plurality of said sheets for a first predetermined time to a first density, heat aging a second plurality of said sheets for a second predetermined time, different from said first predetermined time, to a second and lower density, stacking said pluralities of said sheets together in combination to form a laminate with the top edges thereof forming the friction face, and hot pressing the laminate to form a pad having areas of multiple densities.

2. The method of claim 1, including the steps of heat aging a third plurality of sheets for a third predetermined time, different from the first and second predetermined times, to a third density higher than the first and second densities, forming the laminate of first, second and third pluralities of sheets so that the pad has a higher density adjacent its outer edge and a lower density adjacent its inner edge.

3. The method any of claims 1 or 2, including the step of manipulating the location of the sheets of different densities in the laminate to control wear and noise characteristics of the pad in operation.

* * * * *